United States Patent [19]

Oomen

[11] Patent Number: 5,078,551
[45] Date of Patent: Jan. 7, 1992

[54] DIAMOND TOOL

[75] Inventor: Johannes M. Oomen, Eindhoven, Netherlands

[73] Assignee: U.S. Philips Corporation, New York, N.Y.

[21] Appl. No.: 581,504

[22] Filed: Sep. 11, 1990

[30] Foreign Application Priority Data

Sep. 18, 1989 [NL] Netherlands .................. 8902323

[51] Int. Cl.⁵ .................................... B23B 27/00
[52] U.S. Cl. .................................. 407/119; 407/118; 125/36; 76/DIG. 12
[58] Field of Search ............... 51/307, 293, DIG. 30, 51/204 R, 295; 125/36, 39; 76/DIG. 12, 101.1; 407/119, 118

[56] References Cited

U.S. PATENT DOCUMENTS 4,268,276  5/1981  Bovenkerk ..................... 51/307
4,619,563 10/1986  Doting ........................ 76/101.1

OTHER PUBLICATIONS

Kirk, *Encyclopedia of Chemical Technology*, vol. 4, pp. 300–303, © *1963*.
*Machine Data Handbook*, 2nd Edition, Metcut Research Associates Inc., Chapter 4 (1972).
"Metastable Materials Formation by Ion Implantation", by N. E. W. Hartley, pp. 295–302 (1982).

*Primary Examiner*—Robert A. Rose
*Attorney, Agent, or Firm*—William Squire

[57] ABSTRACT

A diamond tool 1 comprising a tool tip 5 of boron-containing single-crystal diamond.

5 Claims, 2 Drawing Sheets

DIAMOND TOOL

BACKGROUND OF THE INVENTION

The invention relates to a diamond tool having a work face which forms part of a single-crystal diamond.

DESCRIPTION OF THE PRIOR ART

Such diamond tools are used as cutters for the ultra-precision machining of non-ferrous metal and synthetic resin surfaces and as wire drawing dies. In combination with a precision lathe such a tool can be used to machine objects which meet high optical requirements as regards dimensional accuracy and smoothness. Examples of such objects are dies for aspherical lenses and reflectors. Nowadays, dimensional accuracies better than 0.5 μm can be attained in the case of a workpiece having a diameter of 20 cm. The surface roughness $R_{max}$ (peak-valley value) then amounts to 0.02 μm. In the near future, the permissible tolerances will be tightened up, namely to a value for $R_{max}$ of 5 nm and a dimensional accuracy of 25 nm. It will be obvious that such tolerances cannot be achieved using tools the tip of which is manufactured from sintered diamond grains or diamond grains embedded in a matrix, because the average size of such grains is several μm. For this reason, a sharp and well-defined single-crystal diamond is used as the tool tip in ultra-precision machining, the work face of the diamond being accurately ground to the required shape by means of a special grinding machine. The tool tip of single-crystal diamond is secured to a shank by a special soldering method, and the shank can be mounted on a precision lathe.

A diamond tool of the type described in the opening paragraph is known from Machining Data Handbook, 2nd Edition, Metcut Research Associates Inc., CinCinnati, Ohio (1972) chapter 4, paragraph 4.7. As a result of the increasing demands placed on the dimensional accuracy and surface roughness, the known single-crystal diamonds are no longer suitable as tool tips because the wear of the tool tip adversely affects the attainable accuracy and roughness. Moreover, the life of the tool is uneconomically short. It is to be noted that in an article by N. E. W. Hartley in Metastable Materials Formation by Ion Implantation, Eds. S. T. Picraux et al., New York (1982), pp. 295-302 a description is given of a diamond tool tip whose surface is doped with boron by means of ion implantation. The boron remains concentrated, however, at the surface of the diamond so that a boron-doped surface layer of maximally 0.3 μm is present. When such a tool tip is resharpened after it has been used for a certain period of time, a diamond layer of at least 10 μm is ground off. This means that the boron-containing surface layer has disappeared completely so that boron has to be reimplanted in the tool tip. Such an implantation involves a very expensive processing step. Moreover, the boron-containing surface layer contains mechanical stresses as a result of the expansion in volume of the outermost diamond layer caused by the incorporation of boron in the crystal lattice. Owing to these stresses the diamond material is brittle so that small pieces of diamond chip off the tool tip during operation. These pieces of diamond may have dimensions of several μm so that high-precision surface treatments are no longer possible.

SUMMARY OF THE INVENTION

An object of the invention is, inter alia, to provide a diamond tool whose work face has a substantially improved resistance to wear. This enables ultra-precision turning of the workpieces and leads to an extended life of the diamond tool.

According to the invention, this object is achieved by a diamond tool as described in the opening paragraph, characterized in that boron is dispersed in the diamond. In the single-crystal diamond, boron may be homogeneously dispersed in the entire crystal, but there may also be small local differences in concentration caused by preferred directions of boron diffusion during crystal growth. Such boron-containing single-crystal diamond is found in nature in very small quantities, but nowadays it can also be prepared synthetically. It has been found that boron-containing single-crystal diamond is very suitable for use as diamond tools because the diamond is more resistant to wear than single-crystal diamond which does not contain boron.

An embodiment of the diamond tool according to the invention is characterized in that the single-crystal diamond is a synthetic diamond. It has been found that synthetic single-crystal diamond exhibits less spread in wear than natural diamond.

An embodiment of the diamond tool according to the invention is characterized in that the diamond comprises 1 to 300 ppm of boron. This corresponds to $1.8 \cdot 10^{17}$ to $5.2 \cdot 10^{19}$ boron atoms per cm$^3$ of diamond. As has been stated above, the boron is dispersed in the diamond crystal and local differences in concentration may occur. Without the boron concentrations the favourable properties of a diamond tool comprising such a single-crystal diamond are reduced.

IN THE DRAWING

The invention will be explained in greater detail by means of the following exemplary embodiments and with reference to the accompanying drawings, in which FIG. 1 is a side view of a diamond tool, FIG. 2 is a top view of a diamond tool, FIG. 3 diagrammatically represents the three forces acting on the tool tip during the turning of a workpiece, FIG. 4 shows the variation in force during the turning operation as a function of the chip length when single-crystal natural diamond is used for the tool tip, and FIG. 5 shows the variation in force during the turning operation as a function of the chip length when boron-containing single-crystal synthetic diamond according to the invention is used.

DESCRIPTION OF THE PREFERRED EMBODIMENT

Figure 1:
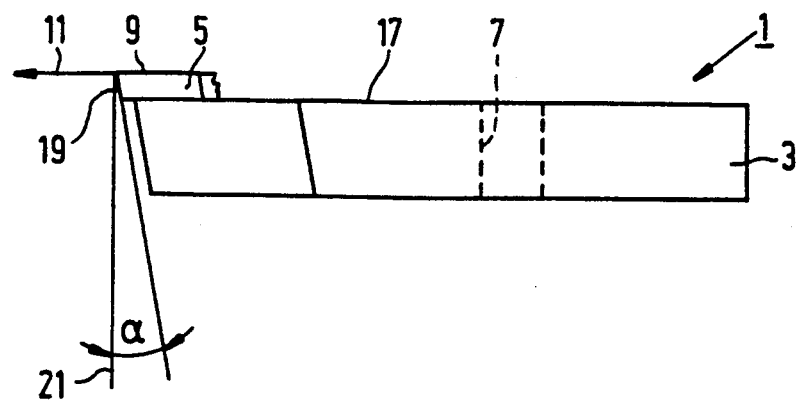
Figure 2:
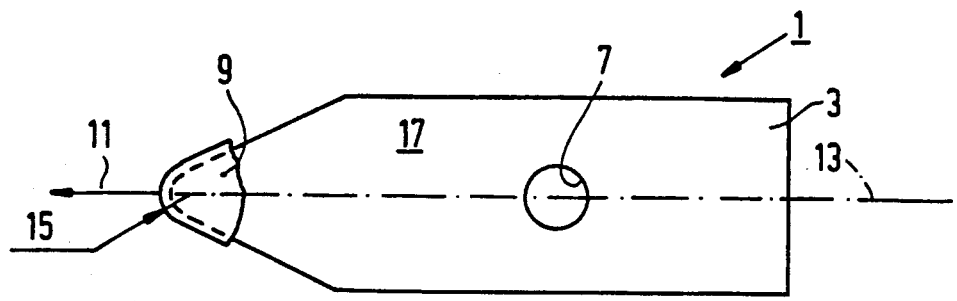

In FIGS. 1 and 2, reference numeral 1 denotes a diamond tool in the form of a cutter. The tool comprises a steel shank 3 at one end of which a single-crystal diamond 5 is soldered as the tool tip. The shank 3 contains a through hole 7 which serves to secure the tool to a lathe. The rake face 9 coincides with a (001)-crystal face of the diamond and extends parallel to the shank surface 17. The crystallographic axial direction 11 of the diamond is selected from the [100]- or [110]-direction and extends parallel to the axis 13 of the tool. The single-crystal diamond 5 is oriented using a Laue X-ray diffraction technique. By means of grinding, the diamond is provided with a cutting edge having a radius 15 of 1 mm. A clearance face 19 has a conical surface and forms an angle α (clearance angle) of 5° with the normal 21 to the rake face 9. The tool tip is polished on a cast-iron grinding wheel which is impregnated with synthetic diamond grains having dimensions of 0.1 to 2 μm.

Figure 3:
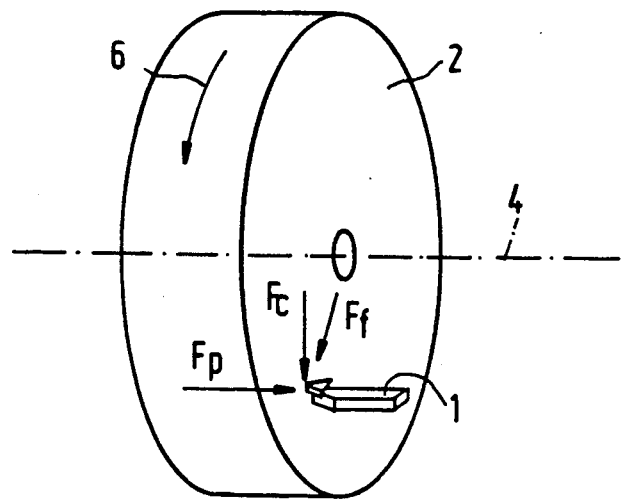

The diamond tool is used in combination with a numerically controlled precision lathe which comprises hydrostatic slides and an air-bearing main spindle. During turning the tool tip is lubricated with kerosene, while the chips originating from the workpiece are exhausted continuously. During the turning operation, the rake face 9 (FIGS. 1 and 2) of the tool tip extends perpendicularly to the workpiece to be machined. The slide on which the diamond tool is provided comprises piezoelectric dynamometers with which the forces acting on the tool tip can be measured in three perpendicular directions (FIG. 3). The three forces are the main cutting force $F_c$, the thrust force $F_p$ and the transverse force $F_f$. FIG. 3 diagrammatically represents the disc-shaped workpiece 2 to be turned which rotates about an axis 4 in the direction of an arrow 6. FIG. 3 shows the forces acting on the tool tip of the diamond tool 1.

A disc-shaped workpiece 2 of electrolytic copper (type ASTM F6877) which is deoxidized under an inert gas is used as the test material for the diamonds to be tested. This material exhibits little variation in terms of hardness and composition and has a very fine microstructure. The "Vickers" hardness is 86 HV.

To determine the resistance to wear of the diamonds an overall chip length of 50 km is turned off the copper disc 2. The speed of rotation of this disc is 1000 rpm. The feed is 5 μm per revolution and the cutting depth is also 5 μm. The three above-mentioned forces are measured at the beginning and after each 10 km of chip length. After 50 km of chip length the so-called crater wear of the diamond is measured by means of a Talystep apparatus. Crater wear is the formation of craters which occurs in the surface of the rake face during the use of the tool.

In the test three single-crystal diamond types are used, namely natural diamond, synthetic diamond and boron-containing synthetic diamond. The latter type of diamond is supplied by Sumitomo Electric Industries Ltd. and contains, dependent upon the location in the crystal, 5.7 to 57 ppm of boron ($10^{18}$–$10^{19}$ atoms of boron per cm$^3$). The measured crater wear in μm is listed in the table below which also contains the crystallographic axial direction 11 used (FIGS. 1 and 2).

TABLE

| | Crater wear in μm | |
|---|---|---|
| | axial direction | |
| diamond type | [100] | [110] |
| natural diamond | 2.38 | 3.00 |
| synthetic diamond | 1.56 | 0.80 |
| B-containing synthetic diamond | 0.00 | 0.00 |

The table shows that synthetic diamond is less subject to wear than natural diamond. Boron-containing diamond exhibits no signs of wear at all after the copper used has been turned off to a chip length of 50 km. In all cases, the [110] axial direction is to be preferred.

Figure 4:
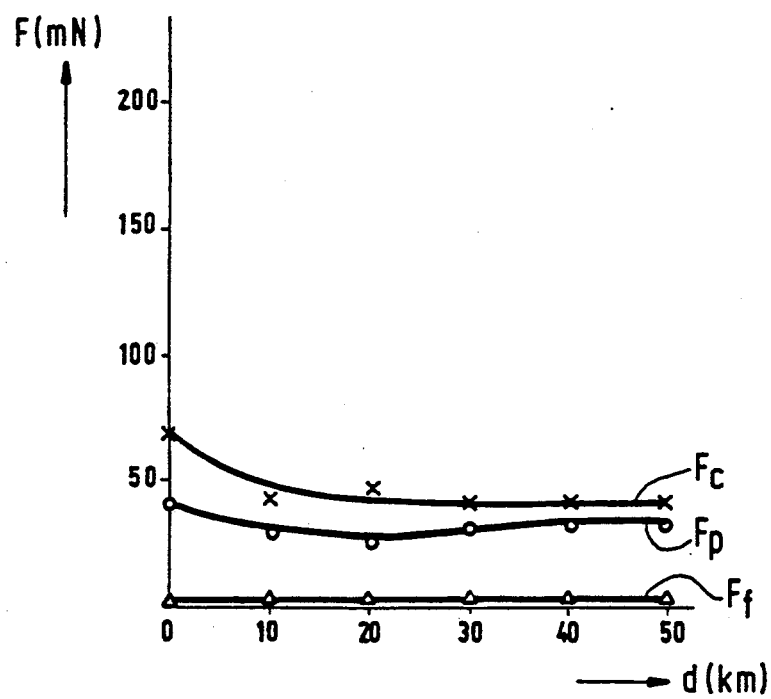
Figure 5:
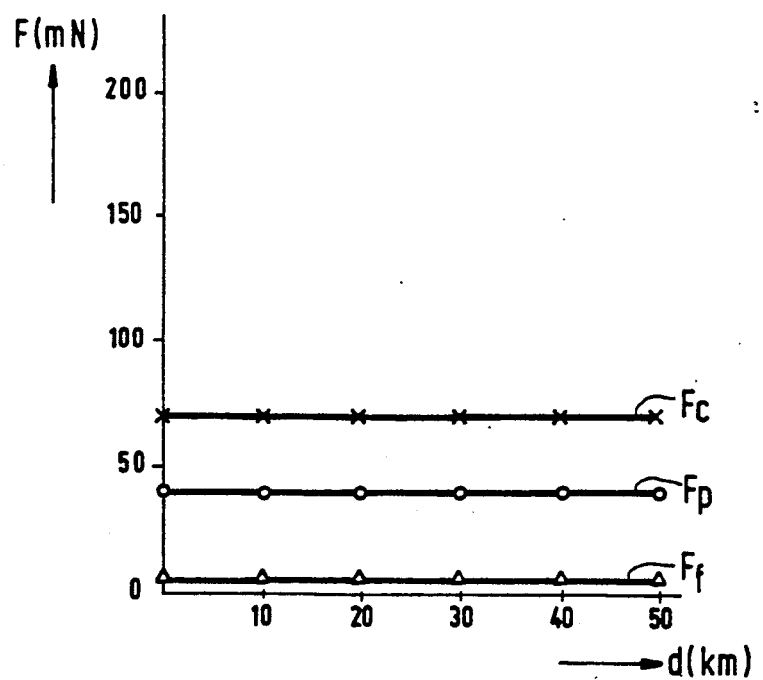

The forces F in mN which occur during turning the copper are plotted in FIG. 4 as a function of the chip length d in km for a tool tip of single-crystal natural diamond. In FIG. 5 the forces are plotted for a tool tip of synthetic single-crystal boron-containing diamond. The reduction of $F_c$ and $F_p$ in the case of natural diamond is an indication of crater formation in the rake face, as a result of which the chips formed can be removed more easily. The crater will increase with time causing the cutting edge to chip. In the case of synthetic single-crystal boron-containing diamond no crater formation takes place and, hence, the forces occurring remain constant. By virtue of the substantially reduced wear when boron-containing single-crystal diamond is used a high dimensional accuracy and surface roughness $R_{max}$ of 5 nm can be attained together with a long working life.

What is claimed is:

1. A diamond tool comprising:
   a shank; and
   a single-crystal diamond comprising boron dispersed throughout the crystal secured to the shank and forming a rake face with the (001) plane oriented parallel to said rake face.

2. A diamond tool as claimed in claim 5 wherein the single-crystal diamond is synthetic.

3. A diamond tool as claimed in claim 5 wherein the diamond contains 1 to 300 ppm of boron.

4. A diamond tool as claimed in claim 2, wherein the diamond contains 1 to 300 ppm of boron.

5. A diamond tool comprising:
   a single-crystal diamond comprising boron dispersed throughout the crystal and forming a rake face with the (001) plane oriented parallel to said rake face; and
   means for securing the diamond to a work tool support.

* * * * *